(12) United States Patent
Daly

(10) Patent No.: US 7,601,958 B2
(45) Date of Patent: Oct. 13, 2009

(54) BROADBAND ENERGY ILLUMINATOR

(75) Inventor: Robert Daly, Orlando, FL (US)

(73) Assignee: Brijot Imaging Systems, Inc., Lake Mary, FL (US)

( * ) Notice: Subject to any disclaimer, the term of this patent is extended or adjusted under 35 U.S.C. 154(b) by 168 days.

(21) Appl. No.: 11/835,930

(22) Filed: Aug. 8, 2007

(65) Prior Publication Data
US 2009/0040092 A1 Feb. 12, 2009

(51) Int. Cl.
*G01J 5/02* (2006.01)
(52) U.S. Cl. .................. 250/330; 250/339.06
(58) Field of Classification Search ................. 250/330, 250/338.1, 339.03, 339.06; 342/22, 82
See application file for complete search history.

(56) References Cited

U.S. PATENT DOCUMENTS

| | | | | |
|---|---|---|---|---|
| 4,023,173 A | * | 5/1977 | Hidaka | 342/179 |
| 4,342,009 A | * | 7/1982 | Dixon, Jr. | 331/107 DP |
| 6,501,414 B2 | * | 12/2002 | Arndt et al. | 342/22 |
| 6,777,684 B1 | * | 8/2004 | Volkov et al. | 250/341.1 |
| 7,358,890 B2 | * | 4/2008 | Price et al. | 342/82 |
| 2008/0298640 A1 | * | 12/2008 | Reinpoldt, III | 382/107 |
| 2009/0041293 A1 | * | 2/2009 | Andrew et al. | 382/100 |

FOREIGN PATENT DOCUMENTS

WO WO 03098741 A1 * 11/2003

* cited by examiner

*Primary Examiner*—David P Porta
*Assistant Examiner*—Mark R Gaworecki
(74) *Attorney, Agent, or Firm*—McKinney Law, PLLC

(57) ABSTRACT

The present invention is a broadband energy illuminator for creating contrast between the broadband energy emanating from a scene and an individual within the scene. A millimeter wave camera is focused toward the individual to detect millimeter wave frequencies reflected from the scene. As an individual passes through scene the millimeter wave camera detects concealed objects by identifying differences in the millimeter wave energy reflected by the individual's body and a concealed object. The broadband energy illuminator focuses a cold source of broadband energy on the scene thereby enhancing the ability of the millimeter wave camera to distinguish the individual's body from concealed objects. A composite image is generated by a central processing unit and displayed on a monitor showing the concealed object on the individual through optical contrast.

11 Claims, 4 Drawing Sheets

BROADBAND ENERGY ILLUMINATOR

BACKGROUND OF THE INVENTION

1. Field of the Invention

The present invention relates generally to illumination systems, and more specifically to a broadband energy illuminator.

2. Description of the Prior Art

Prior art security systems can be found at transportation centers such as airports, train stations, and other public transportation facilities. In addition, security systems are commonplace at courthouses, government buildings, or public schools to maintain public safety. One of the principal concerns of operators of security systems is the need to protect security personnel and other individuals (e.g. the general public) in the course of conducting a search of a person for concealed objects. The concealed objects that present a danger are weapons, explosives, contraband and other similar items that may endanger security personnel in proximity.

Prior art security systems include metal or chemical residue detectors that require security personnel to be in proximity of the individual. One or more security personnel are required to conduct a hands-on or "wand-based" scan of an individual for whom the metal or chemical residue detector has generated an alarm. An inherent deficiency of this type of security system is the fact that it exposes not only the security personnel to danger, but also other individuals (e.g., travelers in an airport) in the vicinity of the security system to the dangers posed by such concealed objects. Accordingly, there is a need in the relevant art for a security system that has the ability to perform from a stand-off perspective so that security personnel and innocent by-standers are not exposed to any potential threat or danger.

One type of system is a passive millimeter wave camera that has the ability to detect and image objects hidden under clothing. An ideal black material absorbs all the radiant energy and reflects none of the radiant energy to which it is being exposed. Since a "black body" is a perfect absorber of radiant energy, by the law of thermodynamics it must also be a perfect emitter of radiation. The distribution according to wavelength of the radiant energy of a black body radiator depends on the absolute temperature of the black body and not on its internal nature or structure. As the temperature increases, the wavelength at which the energy emitted per second decreases. This phenomenon can be seen in the behavior of an ordinary incandescent object, which gives off its maximum radiation at shorter and shorter wavelengths as it becomes warmer.

All objects are composed of continually vibrating atoms with the higher energy atoms vibrating more frequently. The vibration of all charged particles, including these atoms, generates electromagnetic waves. The higher the temperature of an object, the faster the vibration, and thus, the higher the spectral radiant energy. As a result, all objects are continually emitting radiation at a rate with a wavelength distribution that depends on the temperature of the object and its spectral emissivity.

Accordingly, the passive millimeter wave camera detects radiation that is given off by all objects. The technology works by contrasting the millimeter wave signature of the human body, which is warm and reflective, against that of a gun, knife or other contraband. Those objects appear dark because of the differences in temperature, hence, millimeter wave energy, between the human body and the inanimate objects.

The temperature of the human body is typically 98.6 degrees Fahrenheit. Therefore, when the ambient temperature is much less than the human body temperature, a millimeter wave camera detects the image of the human body fairly easily. However, when the ambient temperature approaches the range of the human body temperature, there appears to be less contrast between the human body and the background scene. This causes the image of the human body to be less defined and less effective in determining the targeted individual and concealed objects. There is no effective method that has been found to address the background scene blending of millimeter wave energy without using expensive cooling apparatus. Clearly there is a need in the art for an apparatus that improves the capability of a millimeter wave camera to operate effectively under relatively high ambient temperatures that is compact and inexpensive.

There is also a need in the art for an improved illumination system for use with a millimeter wave camera that is easy to operate.

It is, therefore, to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

SUMMARY OF THE INVENTION

The invention provides a broadband energy illuminator for use with a millimeter wave camera. The broadband energy illuminator includes a means for illuminating an individual to be scanned with said millimeter wave camera and said means including one or more reflective surfaces orientated so as to reflect a cold source of broadband energy, which is detectibly different from broadband energy emanating from a scene. The cold source of broadband energy is the sky having a frequency between a range of 80-100 GHz. The broadband energy illuminator further comprising a lens interposed between said one or more reflective surfaces and said individual so that said individual is illuminated with said cold source of broadband energy.

It is therefore a primary object of the invention to provide a security system that operates in ambient temperatures within the range of a human body temperature.

Another very important object of the invention is to provide a security system that has the ability to illuminate a human body with broadband energy without any harmful effects.

Another important object of the invention is to provide a security system that is non-invasive to the individual being searched for concealed objects.

Still another very important object of the invention is to provide an improved security system to identify non-metallic concealed objects on an individual such as explosives.

These and other important objects, advantages, and features of the invention will become clear as this description proceeds.

The present invention, accordingly, comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Millimeter wave cameras are detection devices that are operative to detect differences or contrast between millimeter wave energy (e.g. electromagnetic wave energy lying in the 80-100 GHz range) that is naturally emitted by the body of an individual and millimeter wave energy that is reflected by any object concealed on that individual. Each millimeter wave camera further comprises a standard video camera that is operative to produce continuous dynamic images on a real-time basis.

The millimeter wave contrast-based images are superimposed or overlaid on the images of the individual produced by the video cameras to realize a set of composite images. The composite images show both the individual being searched and also any concealed object(s) revealed by the contrast-based images that were generated in conjunction with the millimeter wave cameras.

Figure 1:
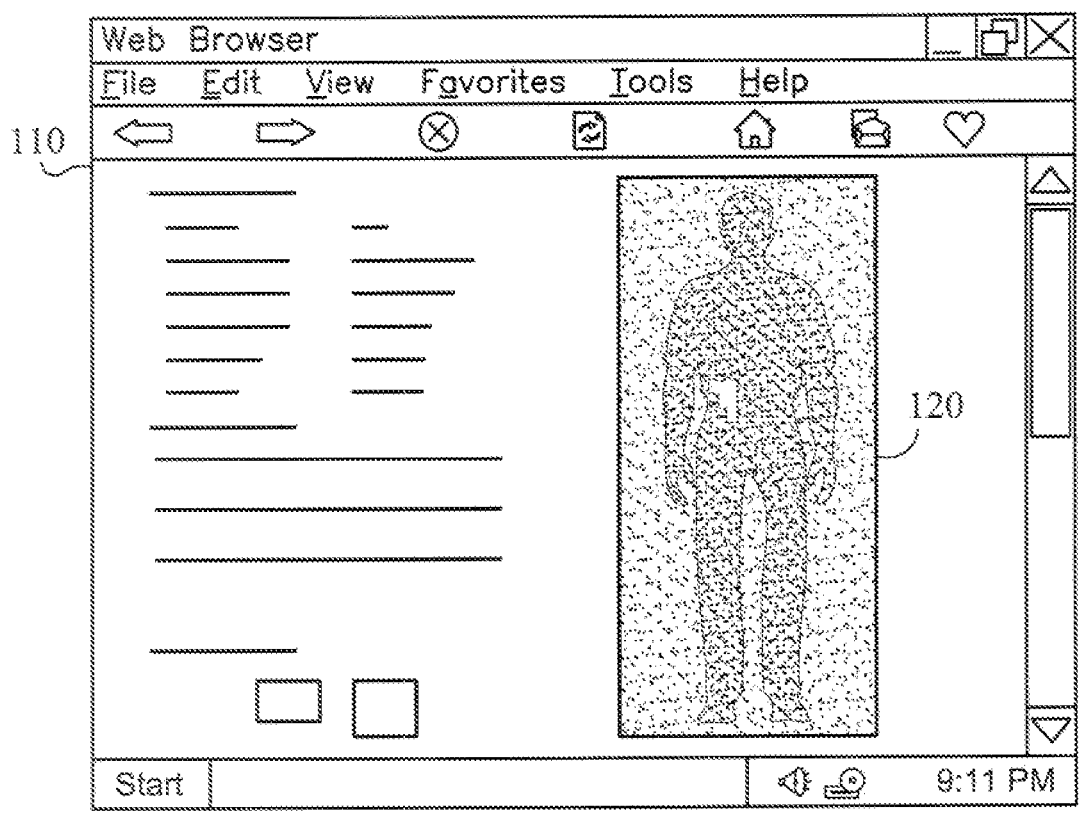
FIG. 1 shows a conceptual view of a two-dimensional composite image generated by a millimeter wave camera.

The operation of the millimeter wave and standard video cameras are mutually synchronized so that their respective images correspond to multiple images of the individual produced at the same instant in time, thereby realizing a continuous, full, surrounding view of the individual being searched. The composite images from the various cameras are coupled by way of electrical communication links (such as a switched Ethernet local area network (LAN)) to a security central processing unit (CPU) for display on a video monitor. The respective images produced by the system may be displayed as two-dimensional images as shown in FIG. 1 or they may be processed for display as a composite three-dimensional images. Each millimeter wave and video camera contains an embedded processor that controls its internal camera circuitry, monitors environmental conditions, and assembles data into time-stamped, sequence-numbered frames, which are then received as input by the CPU for processing and display.

Referring now to FIG. 1 shows a conceptual view of a graphical user interface 110 such that a composite two-dimensional image 120 of an individual is displayed that was generated by a millimeter wave camera imaging system. Imaging zone 120 provides the scope of the image comprising a background scene and an individual. The background scene is at an ambient temperature that approximates the temperature of the human body. Accordingly, the millimeter wave camera imaging system does not provide a clear distinction between the human body and background scene as both are emitting similar radiation signals.

Figure 2:
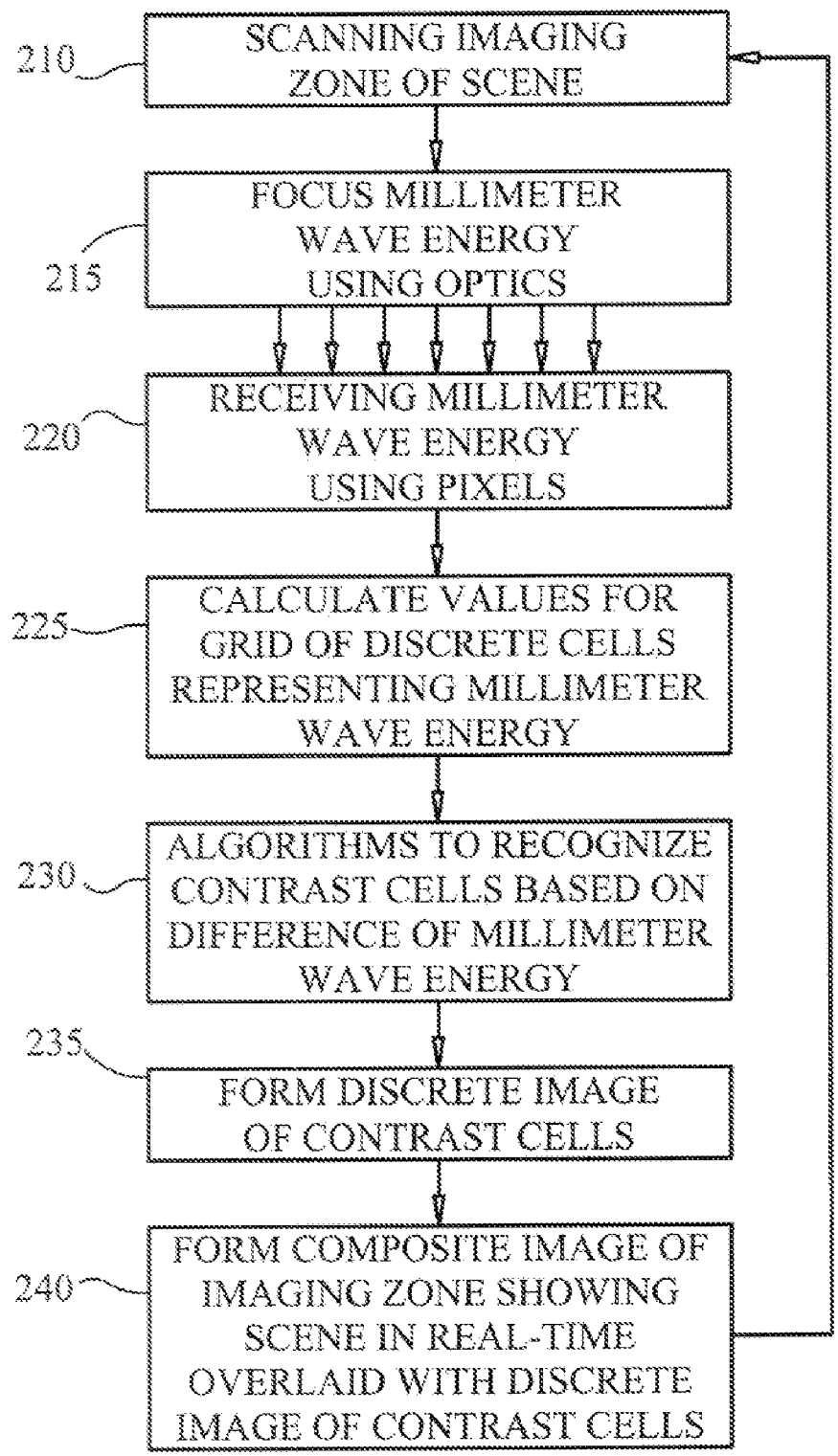
FIG. 2 provides a flowchart illustrating logic that may be used to implement a millimeter wave imaging system in accordance with an embodiment of the present invention.

FIG. 2 shows a flow chart illustrating logic that may be used to implement a millimeter wave imaging system in accordance with the present invention. As shown in FIG. 2, imaging zone is scanned 210. As the imaging zone is scanned, millimeter wave energy is focused using optics 215 onto an array of pixels adapted to receive millimeter wave energy 220. The array of pixels sends signals representing millimeter wave energy values to a CPU. Algorithms process the signals, which recognize and calculate differences of millimeter wave energy 230. A discrete image of contrast cells is formed and a millimeter wave image is generated 235. Subsequently, a real-time video image of imaging zone 110 is overlaid by the respective discrete image of contrast cells forming a composite image showing the location of concealed objects on an individual 240. In the preferred embodiment, only the area of the millimeter wave image recognized as a possible location of a concealed object on an individual overlays the real-time video image.

Figure 3:
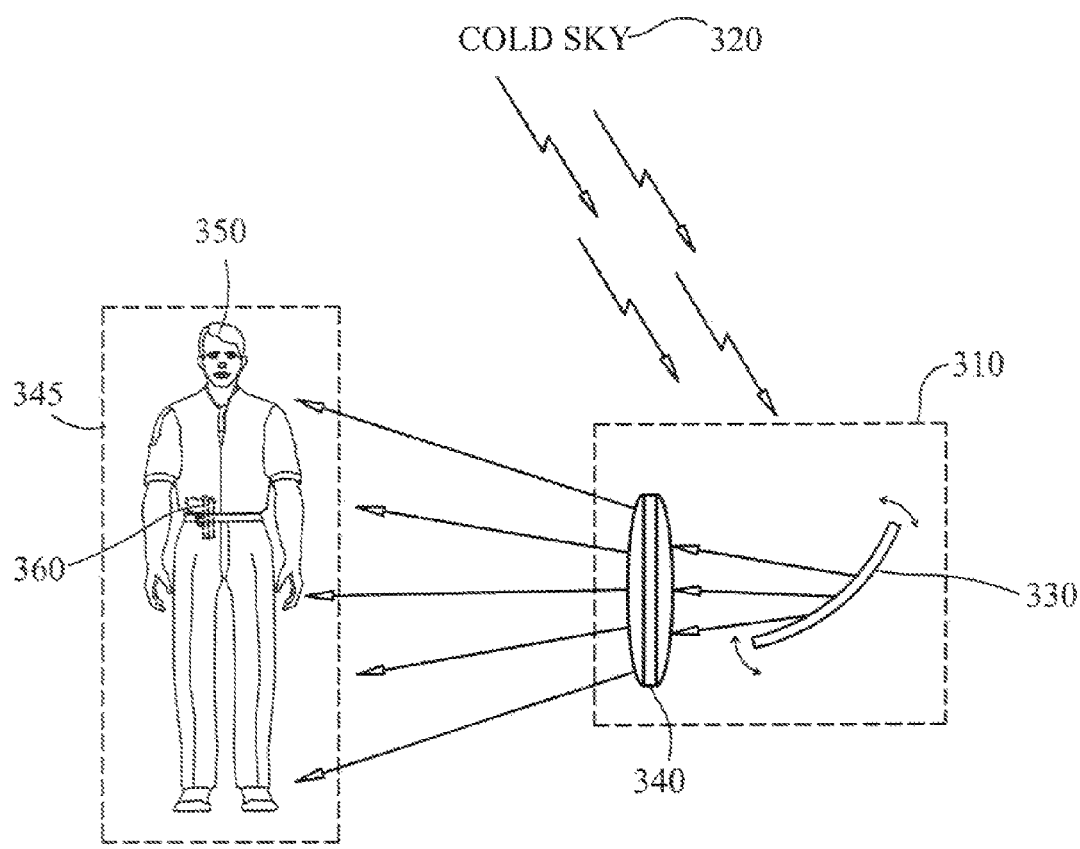
FIG. 3 diagrammatically illustrates an embodiment of the present invention.

Referring now to FIG. 3, the sky 320 is employed to provide a source of cold energy radiation. In accordance with the present invention, a means 310 is provided to illuminate the scene 345 with cold energy radiation, which is approximately 80-100 GHz. Antenna 330 collects cold energy radiation from sky 320 and reflects to a lens 340. Lens 340 focuses cold energy to scene 345. Antenna 330 has the ability to oscillate to increase its efficacy in reflecting cold energy through lens 340. In the preferred embodiment, cold energy radiation focused on scene 345 is uniform to illuminate an area approximately ten feet from lens 340. Concealed object 360 emits radiation that is in contrast to that of individual 350 and is easily distinguished by the millimeter wave imaging system.

Figure 4:
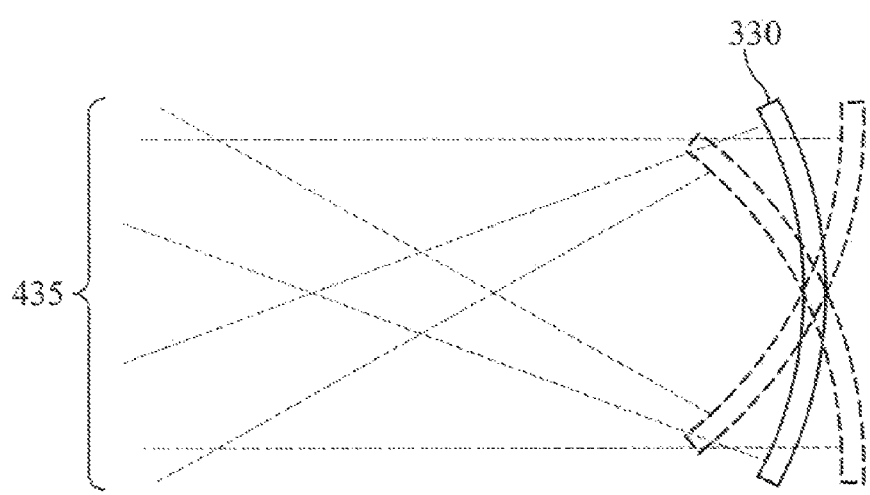
FIG. 4 shows a conceptual view of a receiving antenna to reflect cold energy radiation in accordance to an embodiment of the present invention.

FIG. 4 illustrates receiving antenna 330 oscillating to direct cold energy radiation 435 to lens 340 to form a multi-scan area. In an alternative embodiment, lens 340 is eliminated and receiving antenna 330 oscillates to accomplish a multi-scan area directed to scene 345.

Figure 5:
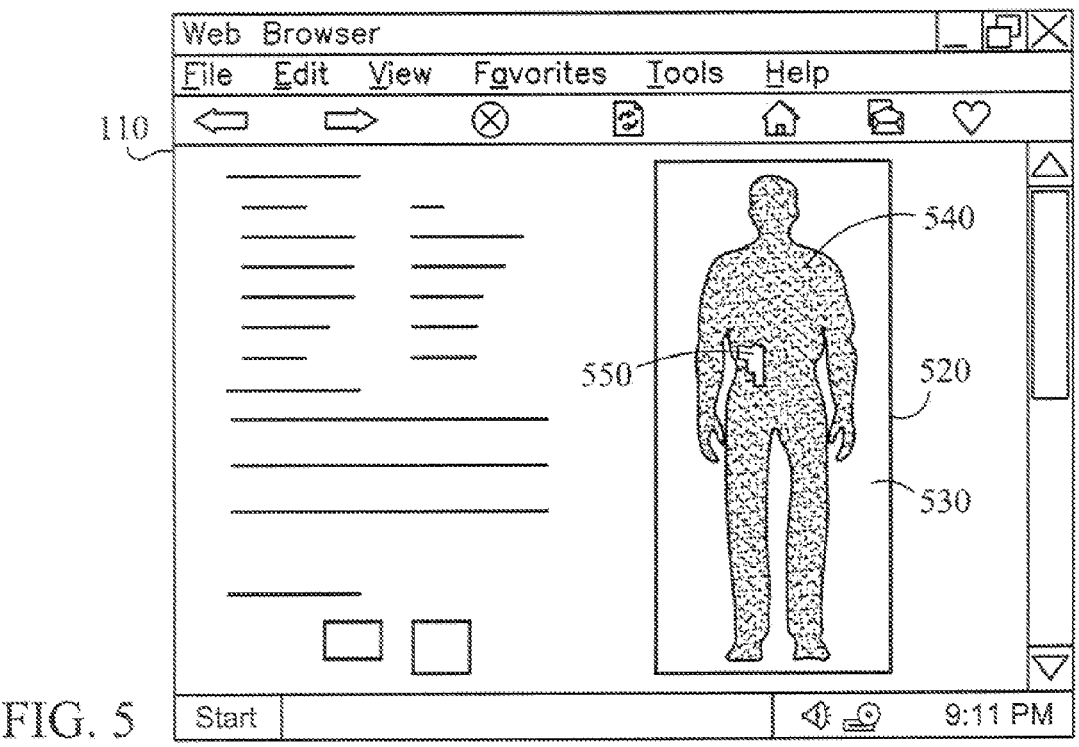
FIG. 5 shows a conceptual view of a two-dimensional composite image generated in accordance with the present invention.

FIG. 5 shows a graphical user interface 110 with a two-dimensional composite image within imaging zone 520. Individual 540 is now clearly defined from background scene 530 thereby making identification of individual 540 much easier. The location and detection of concealed object 550 is revealed on individual 540 as cold energy.

Figure 6:
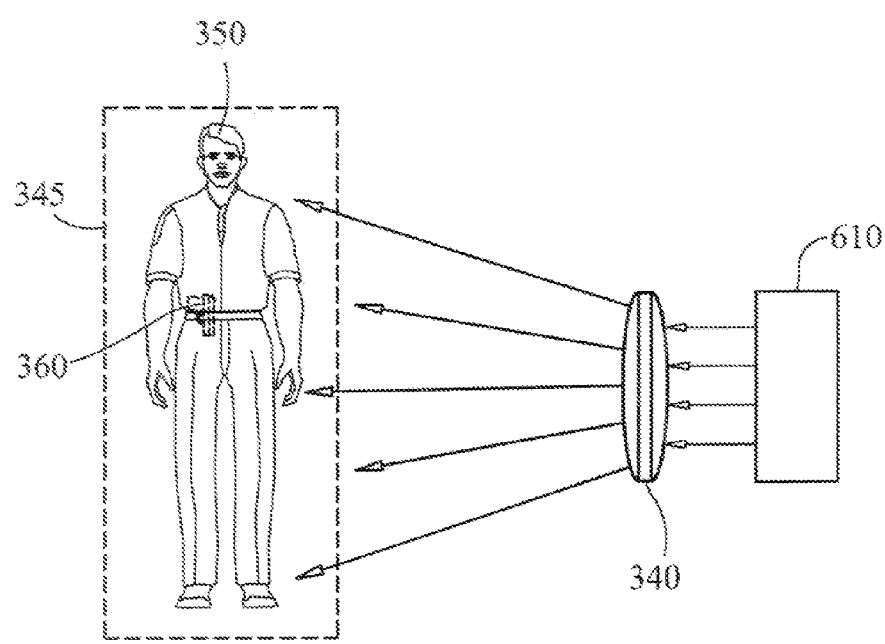
FIG. 6 diagrammatically illustrates an alternative embodiment of the present invention.

Referring now to FIG. 6 illustrates an alternative embodiment of the present invention. Instead of cold sky 320 serving as a source of cold energy, an alternative cold energy source 610 is provided. An alternative cold energy source 610 is required where access to sky 320 is unavailable. For example, where the present invention is deployed indoors or underground. In that type of scenario, a refrigeration means can be used to direct cold energy radiation from source 610 to lens 340 to focus on background scene 345.

Readily understandable diagrams of the present invention described herein illustrate the configurations of the imaging and video processing circuits and components and the manner in which they are interfaced with conventional display equipment. The diagrams show those specific details that are pertinent to the present invention so as not to obscure the disclosure with details, which will be readily apparent to those skilled in the art of having the benefit of the description herein. Thus, the diagrams shown in the drawings are primarily intended to show the various components of the invention in convenient functional groupings, so that the present invention may be more readily understood.

Further, the present invention has been described with reference to flow diagrams and/or block diagrams of methods according to preferred embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

Accordingly, the particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above may be altered or modified and all such variations are considered within the scope and spirit of the invention.

It is also to be understood that the following claims are intended to cover all of the generic and specific features of the invention herein described, and all statements of the scope of the invention, which as a matter of language, might be said to fall there between.

Now that the invention has been described.

What is claimed is:

1. A broadband energy illuminator apparatus for use with a millimeter wave camera, comprising:
    a cold source of broadband energy, wherein said cold source of broadband energy is water having a temperature less than the temperature of a scene;
    means for illuminating an individual to be scanned with said millimeter wave camera; and
    said means including a reflective surface orientated so as to reflect said cold source of broadband energy which is detectibly different from broadband energy emanating from the scene.

2. The broadband energy illuminator of claim 1 further comprising a lens interposed between said reflective surface and said individual so that said individual is illuminated with said cold source of broadband energy.

3. The broadband energy illuminator of claim 1, wherein said cold source of broadband energy having a frequency of a range of 80-100 GHz.

4. The broadband energy illuminator of claim 1, wherein said reflective surface for illuminating the individual with cold energy is a receiving antenna.

5. A broadband energy illuminator apparatus for use with a millimeter wave camera imaging system, comprising:
    an imaging zone, wherein a millimeter wave camera is focused on said imaging zone;
    a video camera focused on said imaging zone at a substantially identical angle and perspective of said imaging zone as said millimeter wave camera;
    a means for illuminating said imaging zone with broadband cold energy, wherein said means includes a reflective surface orientated so as to reflect broadband cold energy from a cold source which is detectibly different from broadband energy emanating from a scene;
    a lens interposed between said reflective surface and an individual to focus said broadband cold energy so that said individual is illuminated with said cold source of broadband energy;
    a means for electrically communicating between said video camera, millimeter wave camera and a central processing unit so that scanning of the individual within said imaging zone that is illuminated with broadband cold energy is simultaneous with said millimeter wave camera and said video camera;
    a millimeter wave receiver for receiving input signals received by said millimeter wave camera to generate millimeter wave images;
    a video receiver for receiving input signals received by said video camera to generate video images;
    a means for synchronizing said millimeter wave images with said video images so that real-time composite images of said millimeter wave images and said video images are generated;
    a means to detect a concealed object on said individual by identifying differences in said millimeter wave energy reflected by said individual and said concealed object received by said millimeter wave camera; and
    a means for displaying said composite images on a video monitor showing said concealed object on said individual.

6. The broadband energy illuminator of claim 5, wherein said cold source of broadband energy having a frequency of a range of 80-100 GHz.

7. A method of illuminating a background scene with cold energy comprising:
    providing a means to reflect a cold source of broadband energy to a background scene which is detectibly different from said broadband energy emanating from an individual, wherein said cold source of broadband energy is water having a temperature less than a temperature of the background scene.

8. The method of claim 7 further providing a lens interposed between said reflective surface and said individual so that said individual is illuminated with said cold source of broadband energy.

9. The method of claim 7, wherein said cold source of broadband energy having a frequency of a range of 80-100 GHz.

10. The method of claim 7, wherein said means for reflecting said cold energy of broadband energy is a receiving antenna.

11. A method of illuminating a background scene with cold energy comprising:
    providing a means to reflect a cold source of broadband energy to a background scene which is detectibly different from said broadband energy emanating from an individual;
    focusing a millimeter wave camera on an imaging zone;
    focusing a video camera on said imaging zone at a substantially identical angle and perspective of said imaging zone as said millimeter wave camera;
    illuminating said imaging zone with broadband cold energy, wherein a reflective surface is orientated so as to reflect broadband cold energy from a cold source which is detectibly different from broadband energy emanating from the background scene;

interposing a lens between said reflective surface and said individual to focus said broadband cold energy so that said individual is illuminated with said cold source of broadband energy;

electrically communicating between said video camera, millimeter wave camera and a central processing unit so that scanning of the individual within said imaging zone that is illuminated with broadband cold energy is simultaneous with said millimeter wave camera and said video camera;

receiving input signals received by said millimeter wave camera to generate millimeter wave images;

receiving input signals received by said video camera to generate video images;

synchronizing said millimeter wave images with said video images so that real-time composite images of said millimeter wave images and said video images are generated;

detecting a concealed object on said individual by identifying differences in said millimeter wave energy reflected by said individual and said concealed object received by said millimeter wave camera; and displaying said composite images on a video monitor showing said concealed object on said individual.

\* \* \* \* \*